Patented Nov. 17, 1942

2,302,393

UNITED STATES PATENT OFFICE 2,302,393

METHOD OF CONCENTRATING STEEP WATER

Herman H. Schopmeyer, Hammond, Ind., assignor to American Maize-Products Company, a corporation of Maine No Drawing. Application December 3, 1940, Serial No. 368,342

4 Claims. (Cl. 99—2)

This invention relates to a method of concentrating corn steep water so as to produce a product suitable for incorporation into mixed feeds.

An early step in the process of corn refining is the steeping of corn at about 120° F. in water containing a small proportion of sulphur dioxide. During this steeping operation, 3 to 4 pounds or so of water soluble materials, including proteins, are extracted for a bushel of corn steeped. The resulting steep water is separated from the remaining parts of the corn and the steep water is then subjected to evaporation in vacuum pans. In a typical operation, the steep water is thus concentrated to a viscous suspension or pasty mass that is removed from the evaporator and subsequently compounded into feed stuffs.

In this usual method, it is not practicable to produce an evaporated steep water mixture that is free-flowing at a concentration much above 42 parts of solids for 100 parts of the evaporated mixture, proportions here and elsewhere herein being expressed as parts by weight. Furthermore, frequent shut-downs and cleaning of the evaporator are necessitated by the gumming and scaling of steam coils or other heating elements of the evaporator with an adhesive mass that is frequently called "rubber" in the industry.

The present invention provides a method in which the objectionable formation of gum or scale during the evaporation of steep water is minimized. In a preferred embodiment the invention provides also a method of making a steep water that is free-flowing at concentrations as high as 50 to 55% or more of total non-volatile material.

The invention comprises, first, preheating the steep water so as to cause flocculation of material that, if not removed, causes gumming or scaling in subsequent evaporation. The flocculated material is then further heated so as to denature the flocculated material. The solution is then concentrated by evaporation.

The denaturing is effected to advantage by continuing the heating subsequent to the flocculation in pressure equipment, to a temperature at least approximately as high as 240° F. and below the temperature of objectionable decomposition of material in the steep water. When so denatured, the flocculated material loses much of its property of being sticky or gelatinous. The material still adheres somewhat to the heating tubes of the evaporator, but an evaporator run with the steep water including the denatured material requires cleaning only about half as often at the worst as an evaporator run in comparable manner on conventional steep water. Furthermore, the scale is relatively easily removed, even after the longer period of operation, when the steep water has been treated as described to cause denaturing of the coagulated material.

The denatured material is characterized by low tendency to undergo deflocculation when an aqueous suspension including the material is allowed to stand. When, for example, steep water is heated at about 160° F. or somewhat higher temperature, to cause flocculation, and the heating then discontinued, the resulting mixture on standing and cooling shows deflocculation (redispersion) of the material initially coagulated or flocculated. If, however, the steep water heated initially at about 160° F. is then raised to a temperature of about 240° F. or slightly higher, the coagulated material does not disappear, as by deflocculation or redispersion, if the mixture is allowed to stand and become cool.

Temperatures of 240° to 350° F. or somewhat higher may be used to effect the denaturing. However, the use of very high temperatures is not so convenient as heating to around 240° F.; the slight gain, if any, in completeness of the denaturing at the higher temperatures is more than offset by the inconvenience in using the excessively high temperatures.

In a modification of the general method, the denatured material formed by preheating steep water as described is removed by physical means. Thus the flocculated material may be separated centrifugally, as in a conventional centrifugal of the skimmer type, or by filtration. The filtrate is then evaporated in a vacuum evaporator to the desired concentration.

If filtration is used as a method of removing the flocculated and denatured material, the filtration is suitably made under pressure and in the presence of admixed filter aid such as calcined diatomaceous earth, the proportion of filter aid being adjusted in accordance with usual technique, the amount used being increased more or less in proportion to the rate of filtration desired.

If the physical means of removing the coagulated material from the preheated steep water are employed, then the separated solid material as from the centrifuge or filter, may be incorporated into feeds along with the solids obtained by evaporation of the separated liquor as described below.

Whether the material denatured by heating at about 160° F. is left suspended in the liquor or is separated out, the remaining liquid is transferred to an evaporator, suitably a series of vacuum pans, and evaporation is continued until the desired proportion of non-volatile material to water is obtained. With the preheated liquor of the present invention, this concentration may be continued to advantage until there is produced a composition including approximately 50% or somewhat more of non-volatile material and yet is sufficiently free-flowing for convenient withdrawal in hot condition from the evaporator and subsequent handling and blending into feed compounds.

The vacuum evaporation is conducted at a temperature below that of the preceding denaturing. I have obtained particularly satisfactory results when the temperature of concentration does not substantially exceed 150° F.

In a typical example of the practice of the invention, steep water of pH approximately 3.8 to 4.4 was heated by a passage through a heat exchanger, the temperature being raised to 160° F. At this temperature there was commencement of flocculation of coagulable material. The heating was then continued and the temperature raised to 240° F., the steam pressure being about 10 pounds. There was thus formed a denatured coagulated protein material that is much less adhesive than the material ordinarily deposited during the evaporation of steep water at the lower temperatures prevailing in the vacuum evaporator.

The mixture containing the denatured coagulated material, in the form of a suspension, was then subjected to vacuum evaporation, to cause concentration, in equipment and at temperatures that are conventional for the evaporation of steep water to be incorporated into feeds.

The vacuum evapoartors may be run, without cleaning, for two to three days, whereas in the conventional process of concentrating steep water that has not been pretreated, the evaporators become badly fouled in one day's operation.

The material which appears as suspended solid after the preheating and denaturing of the steep water closely resembles in analysis the so-called "rubber" removed from the tubes of an evaporator operating upon steep water that has not been preheated and denatured. Comparative data are shown in the following table:

| Component | Material precipitated by preheating steep water | "Rubber" formed on evaporator coils |
|---|---|---|
| | Per cent | Per cent |
| Protein | 77 | 83 |
| Ash | 4.4 | 4.8 |
| Phosphorous calculated as $P_2O_5$ | 3.0 | 3.5 |

The amount of the material precipitated by the preheating of steep water corresponds ordinarily to about ½ to 1% of the protein content of the original steep water.

Steep water concentrated as illustrated in the example and as delivered hot from the evaporator was free-flowing at a concentration of 55% of non-volatile material with the coagulated and denatured material left suspended, whereas steep water as ordinarily processed is not free-flowing under such conditions at concentrations of solids appreciably above 42%.

The preheating referred to herein may be produced in any suitable manner as by immersed steam coils, open steam pipes or heat exchanger tubes. Very satisfactory results are obtained when the period of preheating to cause denaturing is short, say, a minute or less, and the liquid is being passed rapidly over the heating surfaces.

Coagulation is promoted by adjustment of the pH to approximately 6.5. However, a satisfactory range of pH during the preheating step is 3.8 to 6.5.

It will be understood that the details given are for the purpose of illustration and that variations within the spirit of the invention are intended to be included within the scope of the appended claims.

What I claim is:

1. In making a solution of water soluble substances from corn steep water, the method which comprises preheating the steep water at a pH of approximately 3.8 to 6.5 to an elevated temperature adapted to cause flocculation of heat coagulable material, continuing the heating to a substantially higher temperature, to denature the said material so as to decrease the tendency to undergo deflocculation on cooling and form an adhering deposit on heated evaporator equipment, and subsequently evaporating the remaining liquor, to cause concentration thereof.

2. In making a solution of water soluble substances from corn steep water, the method which comprises preheating the steep water at a pH of approximately 3.8 to 6.5 to an elevated temperature adapted to cause flocculation of heat coagulable material, continuing the heating to a substantially higher temperature, to denature the said material so as to decrease the tendency to undergo deflocculation on cooling and form an adhering deposit on heated evaporator equipment, and subsequently evaporating the remaining liquor, to cause concentration thereof, at a temperature substantially below the maximum reached during preheating and denaturing of the coagulated material.

3. The method described in claim 1, the said flocculation being caused by heating to a temperature of at least about 160° F. and the denaturing being caused by heating to a temperature of at least approximately 240° F. and below the temperature of objectionable decomposition of materials of steep water.

4. In making a concentrated solution of water soluble substances from corn steep water, the method which comprises preheating the steep water to a temperature of at least about 160° F., to cause flocculation of coagulable material, continuing the heating to a substantially higher temperature to denature the said material, separating the denatured material from the remaining solution, and subjecting the remaining solution to concentration by evaporation, the steep water being at a pH of approximately 3.8 to 6.5 during the denaturing step.

HERMAN H. SCHOPMEYER.